United States Patent [19]

Sasagaki

[11] Patent Number: 5,434,642
[45] Date of Patent: Jul. 18, 1995

[54] CAMERA

[75] Inventor: Nobuaki Sasagaki, Kawasaki, Japan

[73] Assignee: Nikon Corporation, Tokyo, Japan

[21] Appl. No.: 159,943

[22] Filed: Dec. 1, 1993

Related U.S. Application Data

[63] Continuation of Ser. No. 39,754, Mar. 30, 1993, abandoned.

[30] Foreign Application Priority Data

Apr. 6, 1992 [JP] Japan .............................. 4-020638 U

[51] Int. Cl.⁶ .............................................. G03B 17/18
[52] U.S. Cl. ..................................................... 354/471
[58] Field of Search ................................ 354/471–475, 354/289.1, 289.12, 409

[56] References Cited

U.S. PATENT DOCUMENTS 4,291,960 12/1981 Ito et al. ................................. 354/471
4,372,657 2/1983 Iwata et al. ........................... 354/475

Primary Examiner—W. B. Perkey
Attorney, Agent, or Firm—Shapiro and Shapiro

[57] ABSTRACT

A camera comprises an indicating device for indicating a plurality of photographic information pieces in a photography preparation state, a warning signal generating device for making the indicating device undergo a warning indication, a selecting device for selecting either one of a first indication mode and a second indication mode, and an indication controlling device for inhibiting the indicating device from indicating the plurality of photographic information pieces when the first indication mode is selected and while no warning indication is output from the warning signal generating device in the photography preparation state and for permitting the indicating device to indicate the plurality of photographic information pieces irrespective of presence of warning indication from the warning signal generating device in the photography preparation state when the second indication mode is selected.

12 Claims, 8 Drawing Sheets

CAMERA

This is a continuation of application Ser. No. 039,754, filed Mar. 30, 1003, now abandoned.

BACKGROUND OF THE INVENTION

1. Field of the Invention

The present invention relates to a camera with an indication device.

2. Related Background Art

Single lens reflex cameras (SLR) tend to have multiple functions and to have an indication device such as a liquid crystal display (LCD). There are cameras which can indicate photographic information pieces such as a shutter speed, an aperture value, and other marks representing setting conditions of various functions.

Among various cameras, some cameras have no display for shutter speed or aperture value, simplifying an indication device in order to decrease the cost of production.

In either type of the cameras as described, an LED or the like is used to illuminate an indication portion to undergo the indication in case that the liquid crystal display is arranged in a finder.

Recent single lens reflex cameras have a full function of automatic exposure (AE), which can automatically judge and control an exposure amount for example in the condition of rear light conventionally requiring the exposure control. Thus, less photographers need information on the shutter speed and the aperture value. Moreover, the indication is troublesome to the photographers needing no information indication of shutter speed and aperture value, and further could cause a confusion.

On the contrary, the information indication of shutter speed and aperture value is indispensable to photographers such as professional and high level amateur photographers needing exact exposure. A photographer who needed no information indication of such values at the beginning could increase his photographic technique and might want to have such information indication to take a better photograph.

Further in case that the liquid crystal in the finder is illuminated for example by the LED as described, there is such a problem caused that a large dissipation power shortens the battery life.

SUMMARY OF THE INVENTION

It is an object of the present invention to provide a camera which a beginner to the advanced can manipulate at his or her level without feeling difficult or unsatisfied. Another object of the present invention is to save the dissipation power in indication in the camera.

The present invention solving the above problems involves a camera with an indication device capable of indicating a plurality of photographic information pieces, which is provided with indication switching means for switching the indication between a first indication mode and a second indication mode, and with photographic information indication controlling means for inhibiting all the indication of the plural photographic information pieces without affecting a photographic function when the first indication mode is selected by the indication switching means and for permitting the indication of the plural photographic information pieces according to photographic conditions without affecting the photographic function in the second indication mode.

Further, in the present invention, the indication device comprises an LCD and an LED for illuminating the LCD, and the LED is turned off in the first indication mode.

According to the present invention, a camera with an indication device capable of indicating a plurality of photographic information pieces is provided with indication switching means for switching the indication between a first indication mode and a second indication mode, and with photographic information controlling means for inhibiting the indication of shutter speed and aperture value when the first indication mode is selected by the indication switching means and for permitting the indication of plural photographic information pieces according to photographic conditions in the second indication mode.

Further, in the present invention, a warning indication may be effected for example with letters or with a drawing or illustration in the first indication mode.

Further, in the present invention, the indication device comprises an LCD and an LED for illuminating the LCD, and the LED is turned off when the warning indication is not effected in the first indication mode.

In the present invention, inhibited from being selected in the first indication mode is an exposure mode in which a photographer can set either one or both of shutter speed and aperture value.

According to the present invention as described, a photographer necessitating no photographic information such as the shutter speed and the aperture value may employ the first indication mode, in which no troublesome photographic information pieces are indicated to avoid a photographer's confusion, while a photographer necessitating the photographic information may use the second indication mode, in which the indication of photographic information such as the shutter speed and the aperture value is presented in the same manner as in the conventional SLR, whereby any photographer can be fully satisfied.

A camera excellent in operability for beginner may be attained by inhibiting the exposure mode for setting a shutter speed and an aperture value from being selected in the first indication mode, that is, by inhibiting switching into a shutter priority mode, an aperture priority mode, or a manual mode.

Further, the battery life may be extended, because unnecessary photographic information indication is omitted in the first indication mode.

BRIEF DESCRIPTION OF THE DRAWINGS

FIGS. 4A to 4F are drawings to show indication patterns of LCD 14 in various operational conditions when an advance mode is set;

DESCRIPTION OF THE PREFERRED EMBODIMENTS

Figure 1:
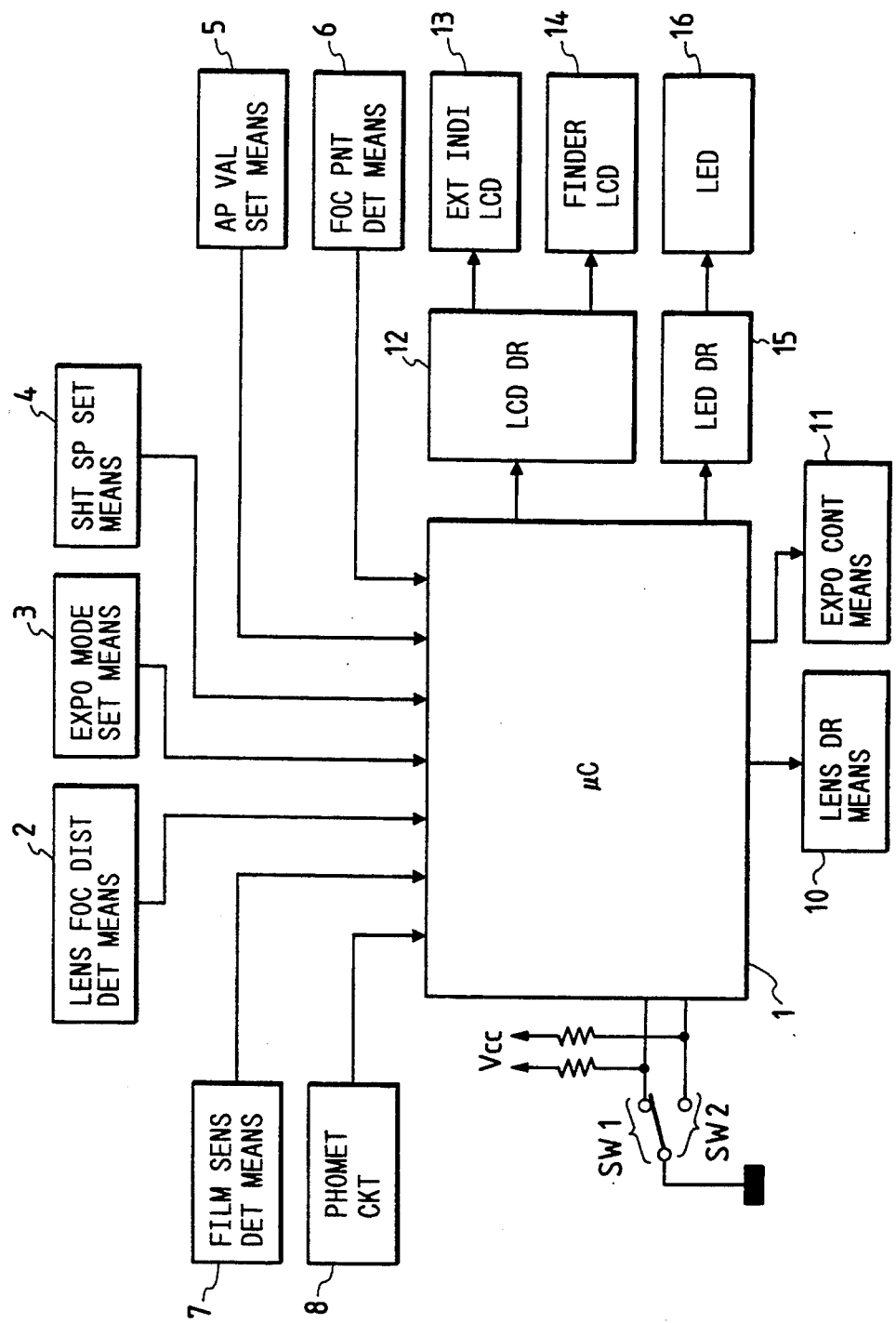
FIG. 1 is a block diagram to show a construction of the present invention.

FIG. 1 is a block diagram to show a construction of a camera according to the present invention.

In FIG. 1, a micro computer (as will be referred to as $\mu C$) 1 performing various controls in camera is connected with a lens focal length detector 2 for detecting a focal length of a photographic lens, an exposure mode setter 3 for setting an exposure mode such as a program mode, a shutter priority mode, an aperture priority mode, and a manual mode, a shutter speed setter 4 for setting a shutter speed when the exposure mode is the shutter priority mode or the manual mode, an aperture value setter 5 for setting an aperture value when the exposure mode is the aperture priority mode or the manual mode, a focal point detector 6 for detecting a condition of focal point to a subject, a film speed detector 7 for detecting or setting a film speed (film sensitivity) of a film loaded, and a photometry circuit 8 for measuring brightness of the subject.

Further, $\mu C$ 1 is connected with a lens driver 10 for moving a focusing optical system of the photographic lens to make the lens in focus and with an exposure controller 11 for driving a shutter and an aperture stop to certain values thereof to carry out photography, based upon respective commands from $\mu C$ 1.

An LCD driver 12 connected with $\mu C$ 1 is for driving an LCD 13 for external indication and an LCD 14 for indication in finder. An LED driver 15 also connected with $\mu C$ 1 is for driving an LED 16 for illuminating the in-finder LCD 14.

Switches SW1 and SW2 are for switching the indication between a first indication mode (simple mode) and a second indication mode (advance mode). In the present embodiment, the simple mode is set with the switch SW1 being on, while the advance mode is set with the switch SW2 being on.

A method of indication in the present embodiment will be next explained with reference to FIG. 2, FIGS. 3A–3D, and FIGS. 4A–4F.

Figure 2:
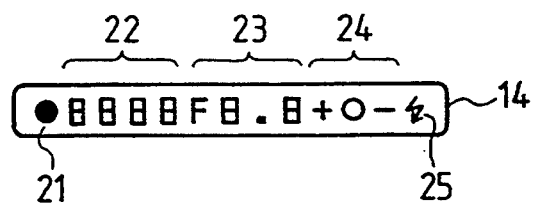
FIG. 2 is a drawing to show an indication pattern of LCD 14 in a finder in an embodiment.

FIG. 2 shows an indication pattern on the in-finder LCD 14 in the present embodiment, in which all indication segments are turned on. The in-finder LCD 14 comprises a focusing indication section 21 in autofocus (AF), a shutter speed indication section 22, an aperture value indication section 23, an exposure indicator 24, and a flash charge end indication section 25. There is no chance in actual operation to turn on all indication segments as shown. The LED 16 for illumination as described above is provided behind the LCD 14.

FIGS. 3A–3D are drawings to show indication patterns of the LCD 14 in various operational conditions when the simple mode is set. FIGS. 4A–4F are drawings to show indication patterns of the LCD 14 in various operational conditions when the advance mode is set. FIG. 3A and FIG. 4A, FIG. 3B and FIG. 4B, and so on show indications in the simple mode and in the advance mode, respectively, under the same photographic conditions.

Figure 3A:
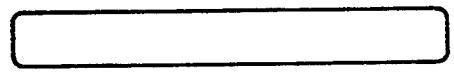
FIGS. 3A to 3D are drawings to show indication patterns of LCD 14 in various operational conditions when a simple mode is set.

FIG. 3A and FIG. 4A respectively show a case in which there is no problem for execution of photography and no special necessity of warning when the exposure mode is the program mode. In this case, all the indication segments are turned off and the LED 16 for illumination is also turned off in the simple mode as shown in FIG. 3A. This prevents a beginner from feeling uneasy with an indication which the beginner does not understand. Also, turning off the LED 16 large in dissipation power may lengthen the battery life. In the advance mode, there are indicated a focus indication in AF, and a shutter speed and an aperture value controlled. This makes the camera satisfactory to the intermediate to the advanced photographers, allowing the same manipulation as in the conventional SLR's, as shown in FIG. 4A.

Figure 3B:
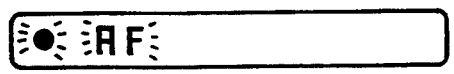

FIG. 3B and FIG. 4B respectively show an indication of warning when AF fails focusing and when the exposure mode is the program mode. In the simple mode, the focus mark is turned on and off, and letters "AF" are also turned on and off in the shutter speed indication section 22, as shown in FIG. 3B. This allows a beginner to understand the meaning of the warning. In the advance mode, only the focus mark is turned on and off as shown in FIG. 4B.

Figure 3C:
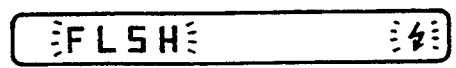

FIG. 3C and FIG. 4C respectively show an indication of warning when the exposure mode is the program mode and when the shutter speed is slow with a dark subject to raise a possibility of hand shake. In the simple mode, letters "FLSH" (abbreviation of FLASH) are turned on and off in the shutter speed indication section 22 to urge use of flash, and the flash charge end indication section 25 is also turned on and off, as shown in FIG. 3C. In the advance mode, the shutter speed indication section 22 is turned on and off to show a possibility of hand shake, and the flash charge end indication section 25 is also turned on and off, as shown in FIGS. 4A to 4F.

Figure 3D:
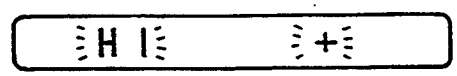

FIG. 3D and FIG. 4D respectively show an indication of warning when the exposure mode is the program mode and when over exposure could result with a subject being too bright out over a high brightness side control limit. In the simple mode, letters "HI" indicating the over exposure are turned on and off in the shutter speed indication section 22, and + mark is also turned on and off in the exposure indicator, as shown in FIG. 3D. In the advance mode, the + mark is turned on and off in the exposure indicator, as shown in FIG. 4D.

In the present embodiment as described, the indication pattern in the single mode is different even in the same warning indication from that in the advance mode, so that the indication may be readily understood in the simple mode while maintaining the high grade feeling as a single lens reflex camera and the excellent operability in the advance mode.

FIG. 4E and FIG. 4F show other indication patterns in an exposure mode other than the program mode, that is, in the shutter priority mode, in the aperture priority mode, or in the manual mode. In the present embodiment, setting into the shutter priority mode, into the aperture priority mode, or into the manual mode is inhibited in the simple mode, as will be described later, and, therefore, no examples of indication for those are shown in the simple mode.

FIG. 4E shows an indication in the shutter priority mode or in the aperture priority mode. There are the focus mark, a shutter speed and an aperture value shown in FIG. 4E. Warning indications in the shutter priority mode or in the aperture priority mode are the same as those in the program mode of FIG. 4B–FIG. 4D.

FIG. 4F shows an indication in the manual mode. In the manual mode, an indication of mark, +◯, or is − added in the exposure indicator. The other sections and warning indications are the same as those in the shutter priority mode or in the aperture priority mode, as described above.

Figure 5:
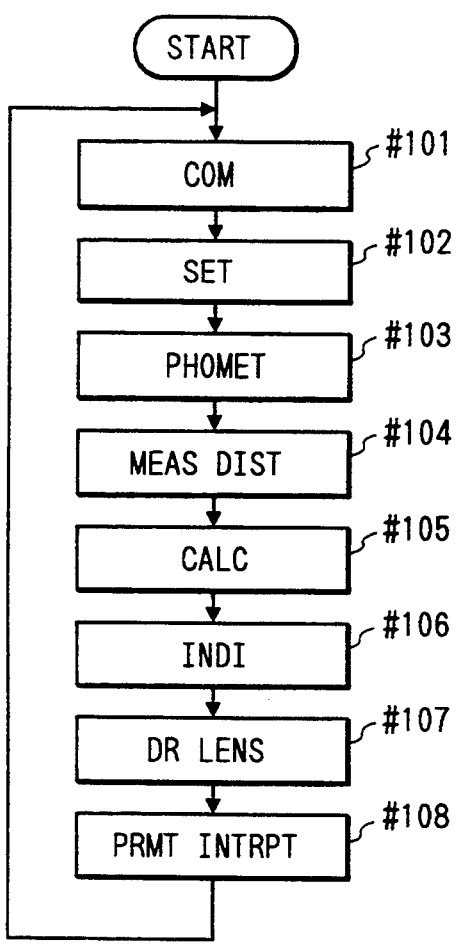
FIG. 5 is a flowchart of main routine in $\mu C\ 1$.

FIG. 5 is a flowchart of a main routine of μC 1 in FIG. 1.

At Step #101, a communication routine is subroutine-called to carry out data communication with the CPU provided in the photographic lens. Data such as a focal length of the photographic lens is input into μC 1 by this communication. This corresponds to the lens focal point detector 2 in FIG. 1.

At Step #102, a setting routine is subroutine-called to set various parameters in μC 1 in accordance with conditions of the exposure mode setter 3, the shutter speed setter 4, the aperture value setter 5, the film speed detector 7, and the switches SW1, SW2. The flow then goes to Step #103.

At Step #103, a photometry routine is subroutine-called to convert an output of photometry from the photometry circuit 8 into luminance information through A/D conversion. The flow then goes to Step #104.

At Step #104, a ranging routine is subroutine-called to obtain information about a current focal point condition from the focal point detector 6.

At Step #105, a computation routine is subroutine-called to execute an APEX operation to obtain an exposure control value in accordance with the setting value information obtained at Step #102 and the luminance information obtained at Step #103. Also, a current focus condition and a drive amount of the photographic lens for focusing are obtained based upon the focal point information input at Step #104. The flow then goes to Step #106.

At Step #106, indication data corresponding to the focus conditions such as the setting value determined at Step #102 and the exposure control value obtained at Step #105 is obtained. The indication data is supplied to the LCD driver 12 and to the LED driver 15 to perform necessary indication. Then, the flow goes to Step #107.

At Step #107, the drive amount of the photographic lens obtained at Step #105 is output to the lens driver 10 to drive the photographic lens.

Finally at Step #108, the interrupt enabling is effected, and the flow then returns to Step #101 to repeat the above steps.

When a release switch (not shown) is turned on in taking a photo, a release interrupt handling routine is executed to control the shutter speed and the aperture value to desired values by the exposure controller 11, as well known. This is omitted to explain here, because it is not directly related to the present embodiment.

Figure 6:
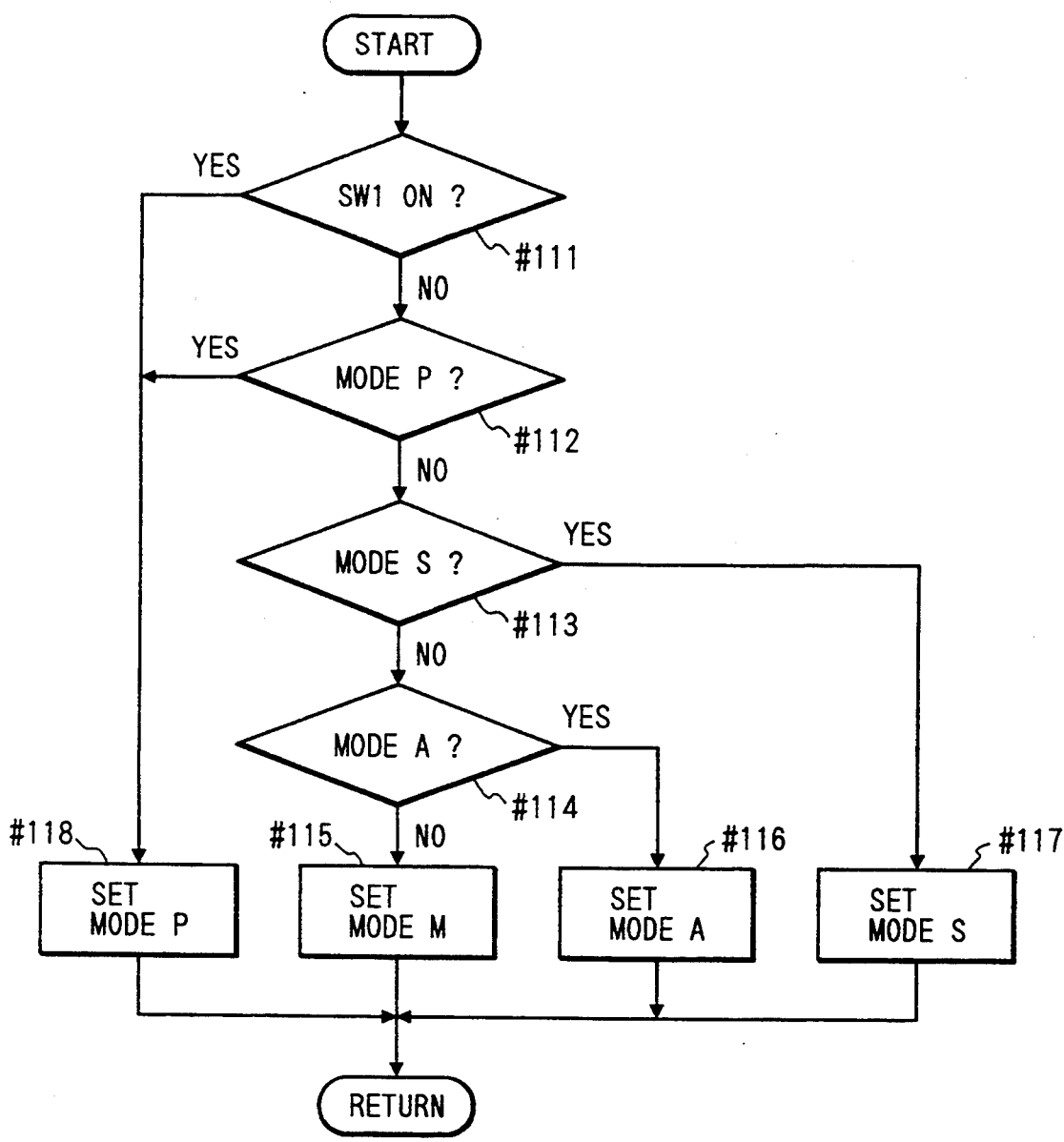
FIG. 6 is a flowchart to show a process concerning setting of exposure mode.

FIG. 6 is a flowchart to show a process concerning the setting of the exposure mode in the subroutine called at Step #102 in FIG. 5.

At Step #111, it is first judged whether the switch SW1 is on. If it is on, the flow proceeds to Step #118 to immediately set the program mode and then to finish the process. If the switch SW1 is off, the flow proceeds to Step #112 to judge whether the program mode is selected. If affirmed, the flow proceeds to Step #118 to set the program mode and then to finish the process. If negated, the flow goes to Step #113 to judge whether the shutter priority mode is selected. If affirmed, the flow goes to Step #117 to set the shutter priority mode and then to finish the process. If negated, the flow goes to Step #114 to judge whether the aperture priority mode is selected. If affirmed, the flow goes to Step #116 to set the aperture priority mode and then to finish the process. If negated, the flow goes to Step #115 to set the manual mode and then finish the process.

In the above process, when the switch SW1 is on, an exposure mode other than the program mode is inhibited from being set in the simple mode. In a modification, a plurality of program modes, for example one for portrait, another for close-up, are prepared so that a plurality of programs may be selectively used in the simple mode.

In the process of FIG. 6, the aperture value setter 3 of FIG. 1 is made effective when the aperture priority mode is selected, the shutter speed setter 4 when the shutter priority mode is selected, and both the aperture value setter 3 and the shutter speed setter 4 when the manual mode is selected.

Figure 7:
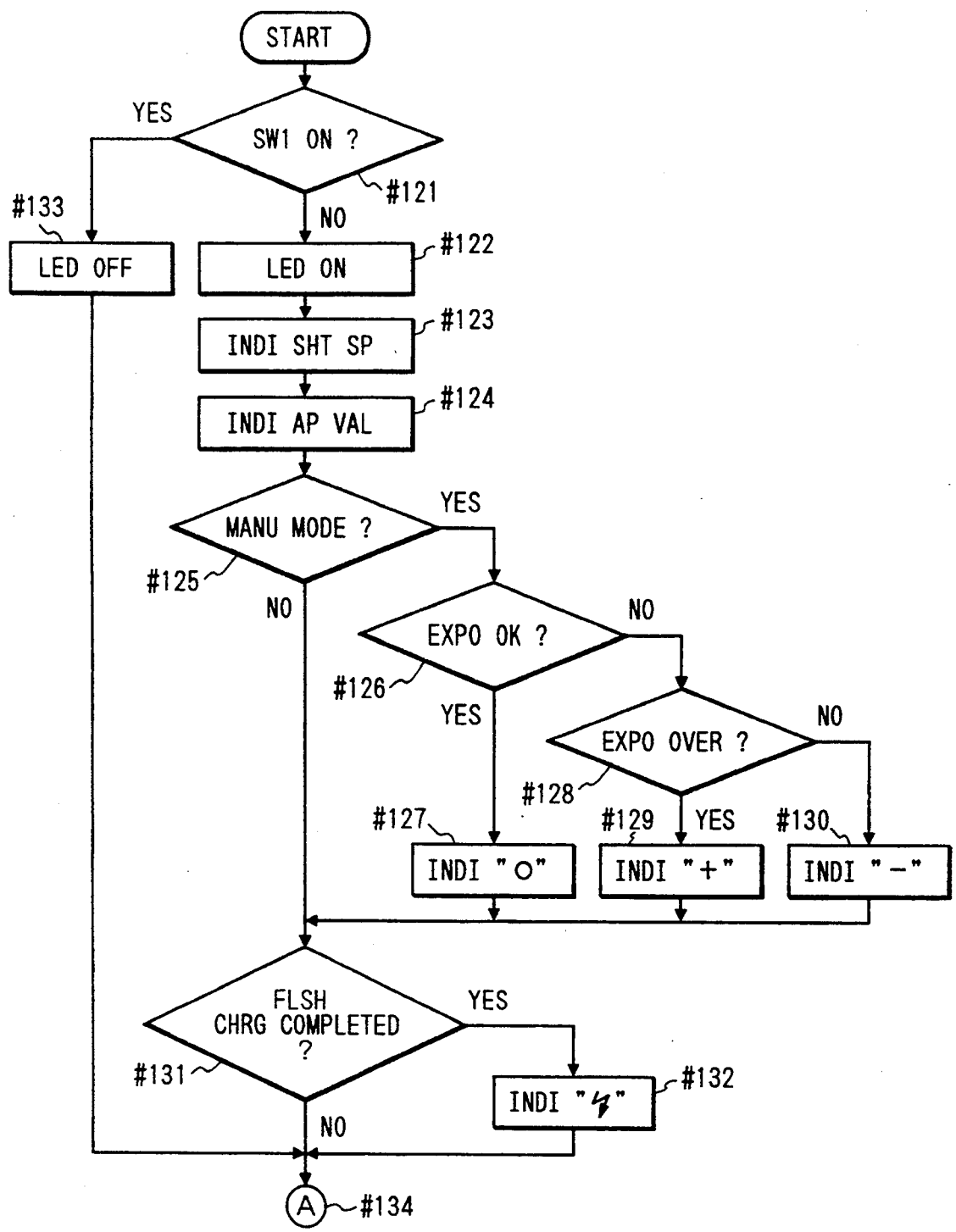
FIG. 7 is a flowchart to show a process in subroutine.

FIG. 7 is a flowchart to show a process of the subroutine called at Step #106 in FIG. 5.

It is first judged at Step #121 whether the switch SW1 is on. If it is on, the LED 16 is turned off at Step #113, judging that the simple mode is selected, and the flow then jumps to Step #134. If the switch SW1 is off, that is, if the advance mode is selected, the LED 16 is turned on at Step #122, and the shutter speed and the aperture value are turned on at Step #123 and Step #124 in the indication sections 22, 23 on the LCD 14.

Next at Step #125, it is judged whether the exposure mode is the manual mode. If the manual mode is selected, either one of the mark +◯, or − is indicated in the exposure indicator 24 in accordance with the exposure conditions at that moment at Step #126 to Step #130, and then the flow goes to Step #131.

At Step #125, if the exposure mode is not the manual mode, the flow immediately moves to Step #131.

At Step #131, it is judged whether the flash charge is completed. If completed, the charge end indication section 25 is turned on at Step #132. Unless completed, or, unless the flash is used, this process is omitted.

Figure 8:
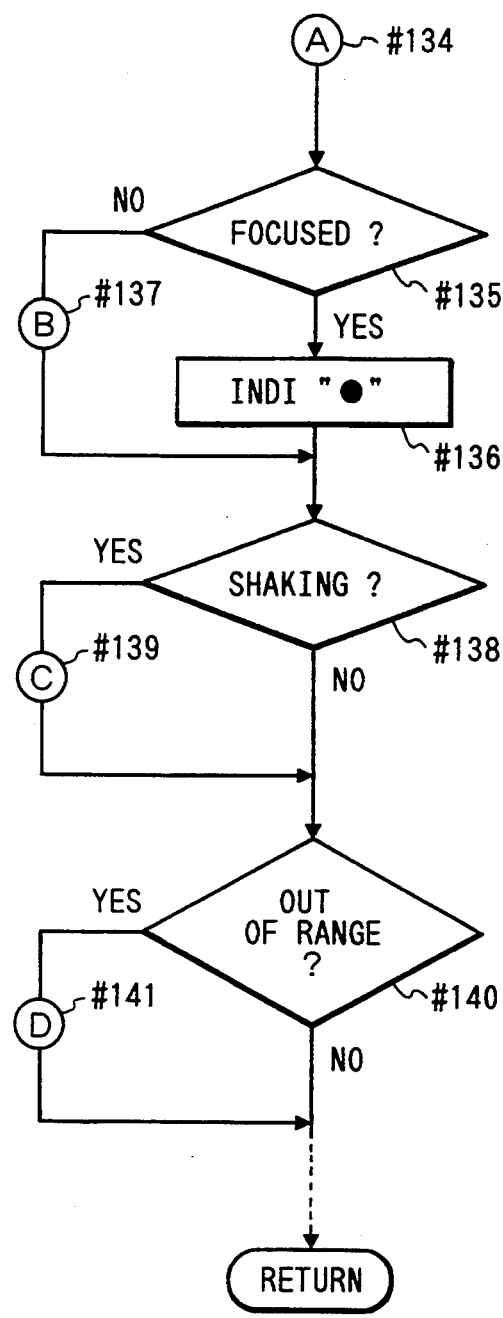
FIG. 8 is a flowchart as to warning indication.

FIG. 8 is a flowchart concerning a warning indication to follow Step #134 in FIG. 7.

First at Step #135, it is judged whether focus is made based upon the output of the focal point detector 6. If in focus, the focus indication mark 21 is turned on at Step #136, and then the flow goes to Step #138. Unless in focus, the process after Step #137 as will be described later is carried out.

At Step #138, it is judged whether hand shake would result if photography is carried out with a shutter speed set by the shutter speed setter 4 or with a shutter speed calculated from the outputs of the film speed detector 7 and the photometry circuit 8. Reference is made in this judgement to the focal length data of the photographic lens detected by the lens focal length detector 2. If it is judged that hand shake results, a process after Step #139 as will be described later is carried out.

Next at Step #140, it is judged whether the shutter speed or the aperture value is out of control range. If out of control range, a process after Step #141 as will be described later is carried out. The process concerning the warning indication may include another warning indication with necessity.

Figure 9:
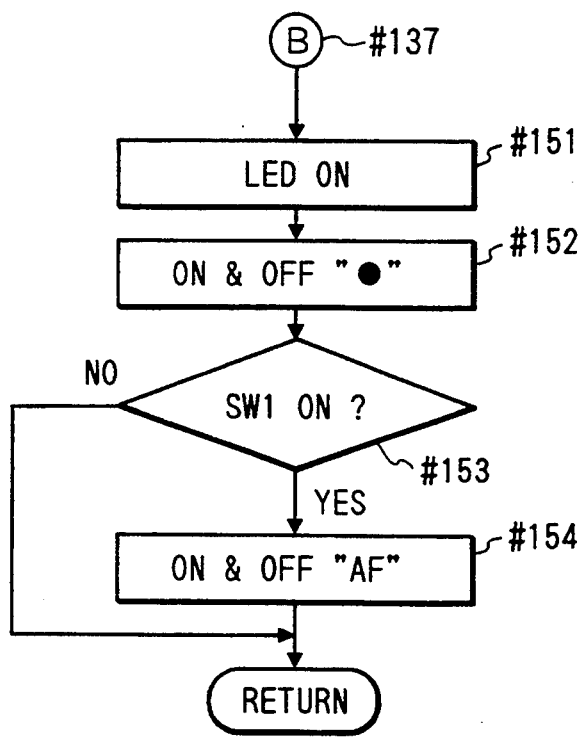
FIG. 9 is a flowchart to show a process of out-focus warning.

FIG. 9 is a flowchart to show the process of out-focus warning.

The flow proceeds from Step #133 as described above to Step #151 to first turn on the LED 16 for warning. The LED 16 has already been turned on in the advance mode, but is first turned on at this stage in the simple mode.

Next at Step #152, the focus mark 21 is turned on and off, and at Step #153 the condition of switch SW1 is checked. If the switch SW1 is on, that is, if the simple mode is selected, letters "AF" are turned on and off in the shutter speed indication section 22 at Step #154. This is a state of FIG. 3B.

At Step #153, if SW1 is off, that is, if the advance mode is selected, this process is skipped. If the advance mode is selected, the shutter speed and the aperture value are indicated at Steps #123 and #124 as described above. This is a state of FIG. 4B.

Figure 10:
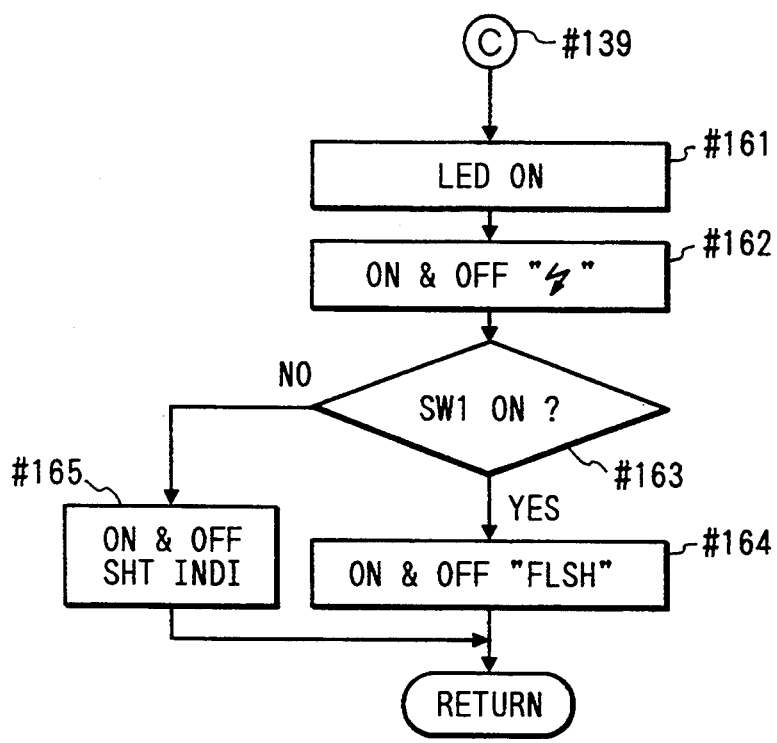
FIG. 10 is a flowchart to show a process of hand shake warning.

FIG. 10 is a flowchart to show a process of hand shake warning.

The flow proceeds from Step #139 as described above to Step #161 to first turn on the LED 16 at Step #161 in the same manner as in the warning of out-focus.

Next at Step #162, the charge end mark 25 is turned on and off, and at Step #163 the condition of switch SW1 is checked. If the simple mode is selected, the flow goes to Step #164 to turn on and off the letters "FLSH" in the shutter indication section. This is a state of FIG. 3C.

At Step #163, if the advance mode is selected, the flow goes to Step #165 to turn on and off numerical values in the shutter indication section. This is a state of FIG. 4C.

Figure 11:
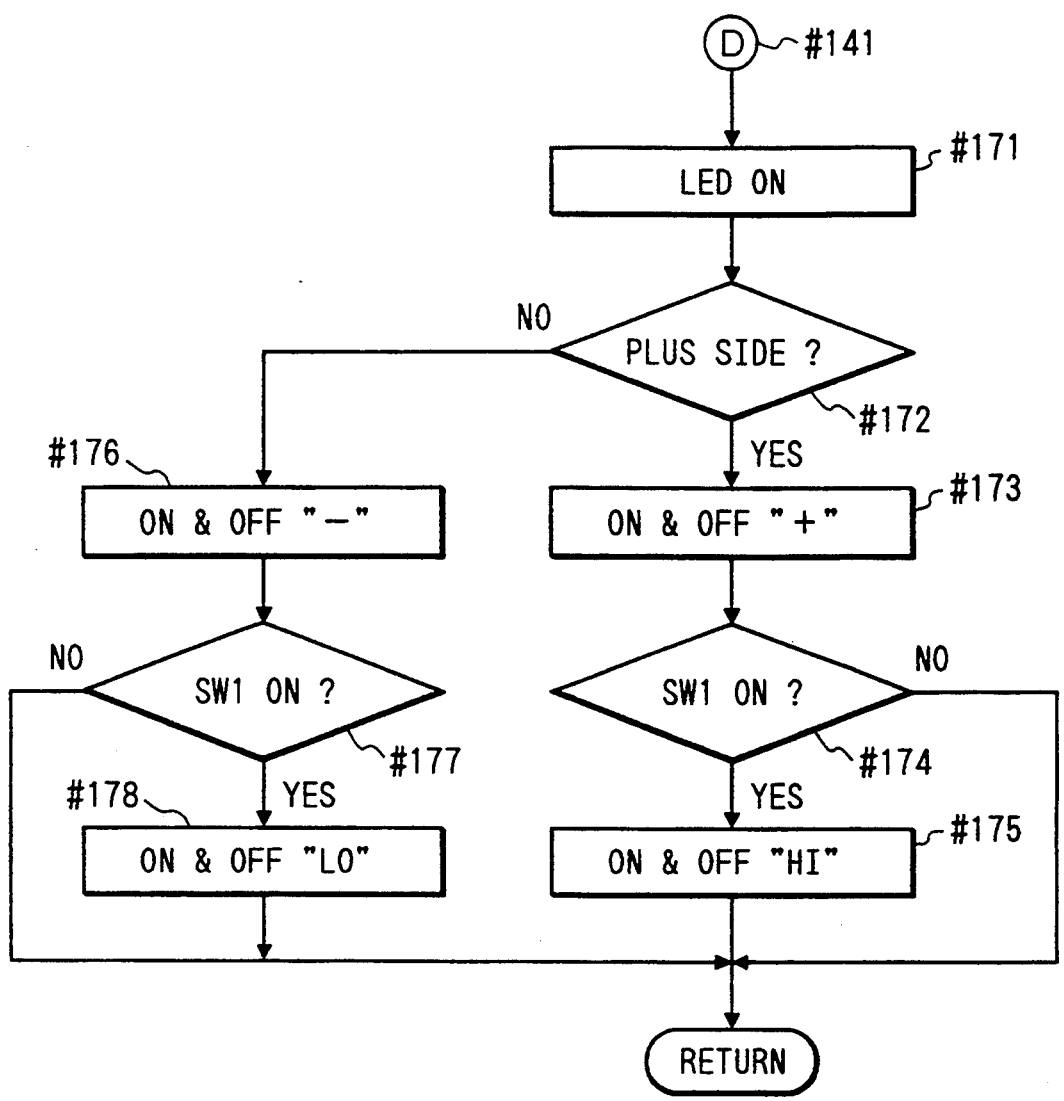
FIG. 11 is a flowchart to show a process of warning when exposure is out of an exposure control range.

FIG. 11 is a flowchart to show a process of warning when exposure is out of control range.

The flow proceeds from Step #141 as described above to Step #171 to turn on the LED 16 in the same manner as in the other warnings.

Next at Step #172, it is judged whether exposure is out of control range on the + side or on the − side. If on the + side, the flow goes to Step #173 to first turn on and off the + mark in the exposure indicator 24.

Next at Step #174, the condition of switch SW1 is checked. If the simple mode is selected, the letters "HI" are turned on and off in the shutter indication section 22 at Step #175. This is a state of FIG. 3D.

At Step #174, if the advance mode is selected, this process is skipped. This is a state of FIG. 4D.

At Step #172, if exposure is out of control range on the − side, the process of from Step #176 to Step #178 is carried out to undergo on-off indication of the mark − and the letters "LO" in the simple mode while on-off indication of the mark − in the advance mode.

The above embodiments were explained with the in-finder LCD 14, but the present invention may be also applied to an external indication LCD 13. In this arrangement, a film counter or the like may be indicated on the external LCD 13. It is preferable in such an arrangement that indications other than the shutter speed and the aperture value be also indicated in the simple mode.

Figure 12:
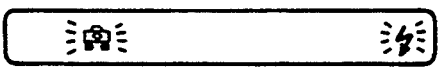
FIG. 12 is a drawing to show an embodiment indicating a warning of camera shake with a drawing.

FIG. 12 is a drawing to show an embodiment in which a warning of camera shake is indicated with a drawing in place of the letters "FLSH" in the hand shake warning indication of FIG. 3C. As in this embodiment, the shutter speed and aperture value indication sections 22, 23 may be formed with a dot matrix LCD so that the warning indications in the simple mode may be indicated by drawings instead of the letters.

Further, the two modes of simple mode and advance mode are set in the above embodiments, but the mode number is not limited to two. Indications of photographic information may be divided into several stages to meet needs of photographer.

As described above, according to the present invention, a photographer needing no photographic information such as the shutter speed and the aperture value may select the first indication mode, in which the troublesome photographic information is not indicated to avoid a photographer's confusion, while a photographer needing such photographic information selects the second indication mode, in which the photographic information such as the shutter speed and the aperture value is indicated in the same manner as in the conventional SLR's, whereby fully meeting the needs of photographer.

If a beginner first selecting the first indication mode has raised his level of photographic technique, he or she can select the second indication mode, which enables satisfactory photography in either mode with a single camera.

Further, if a camera is shared in a family including a beginner and the advanced, for example a married couple, all needs of members are satisfied by the switching of indication mode.

The camera is attained with more excellent operability for beginner by inhibiting the exposure mode for setting the shutter speed and the aperture value, that is, the shutter priority mode, the aperture priority mode, or the manual mode, from being selected in the first indication mode.

Further, the battery life may be extended by obviating unnecessary photographic information indication in the first indication mode.

What is claimed is:

1. A camera comprising:
    indicating means for indicating a plurality of photographic information pieces in a photography preparation state;
    warning signal generating means for making said indicating means undergo a warning indication;
    selecting means for selecting either one of a first indication mode and a second indication mode; and
    indication controlling means for inhibiting said indicating means from indicating said plurality of photographic information pieces when said first indication mode is selected and while no warning indication is output from said warning signal generating means in the photography preparation state and for permitting said indicating means to indicate said plurality of photographic information pieces irrespective of presence of warning indication from said warning signal generating means in the photography preparation state when said second indication mode is selected.

2. A camera according to claim 1, wherein said indicating means comprises an LCD and an illumination device for illuminating said LCD, and wherein said indication controlling means turns off said illumination device when the photographic information pieces are inhibited from being indicated in said first indication mode.

3. A camera according to claim 1, wherein said plurality of photographic information pieces are permitted to be indicated when said first indication mode is selected and when a warning indication is output from said warning signal generating means in the photography preparation state.

4. A camera according to claim 3, wherein an indication of said plurality of photographic information pieces in the first indication mode is made different from that in the second indication mode when a warning indication is output from said warning signal generating means.

5. A camera comprising:

first indicating means capable of indicating a shutter speed set by a photographer or computed in the camera in a photography preparation state;

second indicating means capable of indicating an aperture value set by the photographer or computed in the camera in the photography preparation state;

third indicating means capable of indicating a photographic information piece other than said shutter speed and aperture value in the photography preparation state;

warning signal generating means for making said first to third indicating means undergo a warning indication;

selecting means for selecting either one of a first indication mode and a second indication mode; and indication controlling means for inhibiting said first and second indicating means from indicating the shutter speed and aperture value when said first indication mode is selected and while no warning indication is output from said warning signal generating means in the photography preparation state and for permitting said first and second indicating means to indicate the shutter speed and aperture value irrespective of presence of warning indication from said warning signal generating means in the photography preparation state when said second indication mode is selected.

6. A camera according to claim 5, wherein said first to third indicating means comprises an LCD and an illumination device for illuminating said LCD, and wherein said indication controlling means turns off said illumination device when the photographic information pieces are inhibited from being indicated in said first indication mode.

7. A camera according to claim 5, wherein the indication by said first and second indicating means is permitted when said first indication mode is selected and when a warning indication is output from said warning signal generating means in the photography preparation state.

8. A camera according to claim 7, wherein the warning indication indicated in said first and second indicating means in the first indication mode is made different from that in the second indication mode when a warning indication is output from said warning signal generating means.

9. A camera according to claim 8, wherein the warning indication indicated in said first and second indicating means is a letter or a drawing other than the shutter speed and the aperture value in the first indication mode while the warning indication is a letter or a drawing with the shutter speed and the aperture value in the second indication mode.

10. A camera according to claim 7, wherein a warning indication indicated in said third indicating means in the first indication mode is common to that in the second indication mode when a warning indication is output from said warning signal generating means.

11. A method of indicating in a camera that includes an indicating portion capable of indicating a plurality of photographic information, an indication mode selecting portion capable of selecting either one of a first indication mode and a second indication mode in each of which a different indication is made in a photography preparation state, and a warning generating circuit for generating a warning signal, wherein it is judged whether the first or second indication mode is selected, and a warning signal outputted from said warning generating circuit is detected, and an indication of said indicating portion is inhibited when a warning signal is not outputted from said warning generating circuit in the first indication mode, and an indication of said indicating portion is permitted irrespective of the outputting of a warning signal in the second indication mode.

12. A camera comprising:

an indicating portion having a plurality of indicating elements, said indicating elements being capable of indicating a plurality of photographic information in a photography preparation state;

an indication mode selecting portion having an operating member capable of operation by an external manipulation, for outputting, in response to operation of the operating member, a mode signal indicating either one of a first indication mode and a second indication mode;

a warning generating circuit for generating a warning signal; and a control circuit electrically connected to said indicating portion, said indication mode selecting portion and said warning generating circuit;

wherein said control circuit inhibits an indication of said indicating portion when a warning signal is not outputted from said warning generating circuit and the first indication mode is selected, and permits an indication of said indicating portion irrespective of the outputting of a warning signal when the second indication mode is selected.

* * * * *